United States Patent
Abe et al.

(10) Patent No.: US 7,986,468 B2
(45) Date of Patent: Jul. 26, 2011

(54) LENS BARREL AND IMAGING DEVICE

(75) Inventors: Kentaro Abe, Tokyo (JP); Tomoya Takei, Tokyo (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 12/354,973

(22) Filed: Jan. 16, 2009

(65) Prior Publication Data

US 2009/0185285 A1    Jul. 23, 2009

(30) Foreign Application Priority Data

Jan. 18, 2008    (JP) ............................... P2008-008689

(51) Int. Cl.
    G02B 7/02    (2006.01)
(52) U.S. Cl. ........................................ 359/694; 359/696
(58) Field of Classification Search .................. 359/819, 359/696
    See application file for complete search history.

(56) References Cited

U.S. PATENT DOCUMENTS

2005/0232094 A1* 10/2005 Hoshino .................... 369/44.11
2009/0161231 A1*  6/2009 Shiraki et al. ................. 359/697

FOREIGN PATENT DOCUMENTS

| JP | 10 170211 | 6/1998 |
| JP | 3177931 | 4/2001 |
| JP | 2004 85684 | 3/2004 |
| JP | 2004 221527 | 8/2004 |
| JP | 2006 10568 | 1/2006 |
| JP | 2006 119570 | 5/2006 |
| JP | 2006 214736 | 8/2006 |
| JP | 2009 15023 | 1/2009 |

* cited by examiner

*Primary Examiner* — Ricky L Mack
*Assistant Examiner* — James C Jones
(74) *Attorney, Agent, or Firm* — Frommer Lawrence & Haug LLP; William S. Frommer

(57) ABSTRACT

A lens barrel including: an imaging optical system; a tube configured to contain the imaging optical system; a holder configured to hold a lens included in the imaging optical system in the tube in such a way that the lens is movable along a direction of an optical axis of the imaging optical system; a sensor unit configured to output a cyclic detection signal whose peak value changes depending on a movement amount of the holder; a memory unit configured to store a relationship between peak values of the detection signal and a position of the holder in the direction of the optical axis in advance; and an arithmetic processor configured to calculate a position of the holder in the direction of the optical axis from a peak value of a detection signal detected by the sensor unit in movement of the holder based on the relationship stored in the memory unit.

9 Claims, 9 Drawing Sheets

LENS BARREL AND IMAGING DEVICE

CROSS REFERENCES TO RELATED APPLICATIONS

The present invention contains subject matter related to Japanese Patent Application JP 2008-008689, filed in the Japan Patent Office on Jan. 18, 2008, the entire contents of which being incorporated herein by reference.

BACKGROUND OF THE INVENTION

1. Field of the Invention

The present invention relates to lens barrels and imaging devices, and particularly to a lens barrel including a position detecting mechanism that detects the position of an imaging optical system including a focus lens, a zoom lens, and so on, and an imaging device including this lens barrel.

2. Description of the Related Art

In a video camera device, a movable lens for zooming and a movable lens for focusing are disposed inside a tube in order to achieve a zoom function and an autofocus function, and a drive unit for moving these lenses along the optical axis direction is provided. For accurate control of the driving of the movable lens, the position of the movable lens needs to be accurately detected.

In a related art, the position detection for the movable lens is carried out by a position detecting sensor. As shown in FIG. 15, the position detecting sensor is composed of a position detecting element 6 attached to a tube 4 as a fixed part and a position detection magnet 1 that is so attached to a lens holder 2 for an optical lens 3 as to face the position detecting element 6 and extend along the movement direction of the lens holder 2.

N and S poles of the position detection magnet 1 are so magnetized as to be alternately arranged along the extension direction of the position detection magnet 1 as shown in FIG. 16.

As the position detecting element 6, an MR sensor (magnetoresistive element) is used. The resistance of the magnetoresistive element changes in response to change in a magnetic field. Therefore, upon the movement of the position detection magnet 1 in linkage with the movement of the movable lens, the magnetic field that acts on the position detecting element 6 opposed to the position detection magnet 1 changes and the magnetoresistance value changes.

In linkage with the change in the magnetoresistance value, as shown in FIG. 17, the position detecting element 6 outputs an A-phase detection signal $A \sin \theta$ that changes in the manner of a sine wave with a predetermined cycle and a B-phase detection signal $A \cos \theta$ that changes in the manner of a cosine wave that is different in the phase by $\lambda/4$ from the A-phase detection signal. The position of the movable lens is detected based on these two detection signals.

The lens holder 2 is so held as to be movable in the tube 4 along the direction of an optical axis L by a guide shaft 5 provided in the tube 4 in parallel to the optical axis L. This lens holder 2 is driven along the direction of the optical axis L by a linear actuator. The linear actuator is composed of a drive coil 7, a drive magnet 8, a grounded yoke 9, and an opposed yoke 10.

Examples of documents relating to the related art include Japanese Patent Laid-open No. 2006-10568 (Patent document 1, hereinafter), Japanese Patent Laid-open No. 2004-221527 (Patent document 2, hereinafter), and Japanese Patent No. 3177931.

SUMMARY OF THE INVENTION

However, it is impossible to know the absolute position of the movable lens from only the above-described detection signals $A \sin \theta$ and $A \cos \theta$.

Therefore, in the above-described position detection, the position serving as the reference (reference position) needs to be detected in order to convert a measured position into an absolute value. Patent document 1 discloses a configuration for detecting the reference position. Specifically, in this configuration, a lens holder that moves together with an optical lens is provided with a light-blocking part, and a sensor for resetting such as a photointerrupter is disposed on a fixed part such as a tube.

In the position detecting unit with this configuration, the sensor output is changed from High to Low or from Low to High in response to blocking of the optical path of the photointerrupter by the light-blocking part in the movement of the lens holder. The position corresponding to the timing of the change in the sensor output is detected, and the detected position is defined as the reference position. The position of the lens holder is detected based on this reference position information and the peak value of the output from the position detecting element.

However, for the position detecting unit with this configuration, the reset sensor for the reference position detection is needed outside in addition to the position detecting sensor (the position detecting element 6 and the position detection magnet 1). This increases the size of the entire position detecting system, and thus leads to problems such as cost increase.

As a system to address such a problem, the position detecting system disclosed in Patent document 2 is known. In this position detecting system, a lens holder is brought into contact with a mechanical mechanism such as a mechanical stopper, and the position corresponding to the contact is defined as the reference position. For this system, a reset sensor or the like for the reference position detection does not need to be provided outside.

However, in both the schemes of Patent documents 1 and 2, the detection of the reference position is essential and it is impossible to know the absolute position of the lens holder from only the output signal from the position detecting element 6. Under such a condition, if force such as external shock is applied to the lens barrel in the activation thereof, the stop position of the lens holder will be moved and the accurate position of the lens holder will be lost, so that the lens holder will be out of control. Furthermore, in order for the lens holder to revert to normal operation again, reset operation for detecting the reference position is necessary. In addition, the operation of detecting the reference position needs to be carried out also in the activation of a camera, which leads to a problem that the activation operation of the camera is slow.

There is a need for the present invention to provide a lens barrel that allows achievement of the absolute position of an imaging optical system from only the output of a sensor unit without acquisition of reference position information, and an imaging device including the lens barrel.

According to an embodiment of the present invention, there is provided a lens barrel including an imaging optical system, a tube configured to contain the imaging optical system, a holder configured to hold at least one lens included in the imaging optical system in the tube in such a way that the lens is movable along the direction of the optical axis of the imaging optical system, and a sensor unit configured to output at least one cyclic detection signal whose peak value changes depending on the movement amount of the holder. The lens barrel further includes a memory unit configured to store the relationship between peak values of the detection signal and the position of the holder in the direction of the optical axis in advance, and an arithmetic processor configured to calculate the position of the holder in the direction of the optical axis from a peak value of a detection signal detected by the sensor unit in movement of the holder based on the relationship stored in the memory unit.

According to another embodiment of the present invention, there is provided an imaging device including a lens barrel. The lens barrel includes an imaging optical system, a tube configured to contain the imaging optical system, a holder configured to hold at least one lens included in the imaging optical system in the tube in such a way that the lens is movable along the direction of the optical axis of the imaging optical system, and a sensor unit configured to output at least one cyclic detection signal whose peak value changes depending on the movement amount of the holder. The lens barrel further includes a memory unit configured to store the relationship between peak values of the detection signal and the position of the holder in the direction of the optical axis in advance, and an arithmetic processor configured to calculate the position of the holder in the direction of the optical axis from a peak value of a detection signal detected by the sensor unit in movement of the holder based on the relationship stored in the memory unit.

In the lens barrel and the imaging device according to the embodiments of the present invention, the sensor unit outputs at least one detection signal that cyclically changes depending on the movement amount of the holder, and the peak value of the detection signal changes in such a manner as to decrease or increase depending on the amount of the movement of the holder along the direction of the optical axis. Furthermore, the peak value of the detection signal detected first by the sensor unit at the time of activation of the drive unit is compared with the respective peak values recorded in the memory unit by the arithmetic processor. Subsequently, the position of the holder in the direction of the optical axis, i.e. the position of the imaging optical system, is calculated by using the point that matches the detected peak value as the reference.

Thus, the lens barrel and the imaging device according to the embodiments of the present invention make it possible to know the absolute position of the imaging optical system from only the output of the sensor unit without operation of detecting the reference position in the related art, and detect the position of the imaging optical system.

DETAILED DESCRIPTION OF THE PREFERRED EMBODIMENTS

First Embodiment

Embodiments of the present invention will be described below with reference to the drawings.

Figure 1:
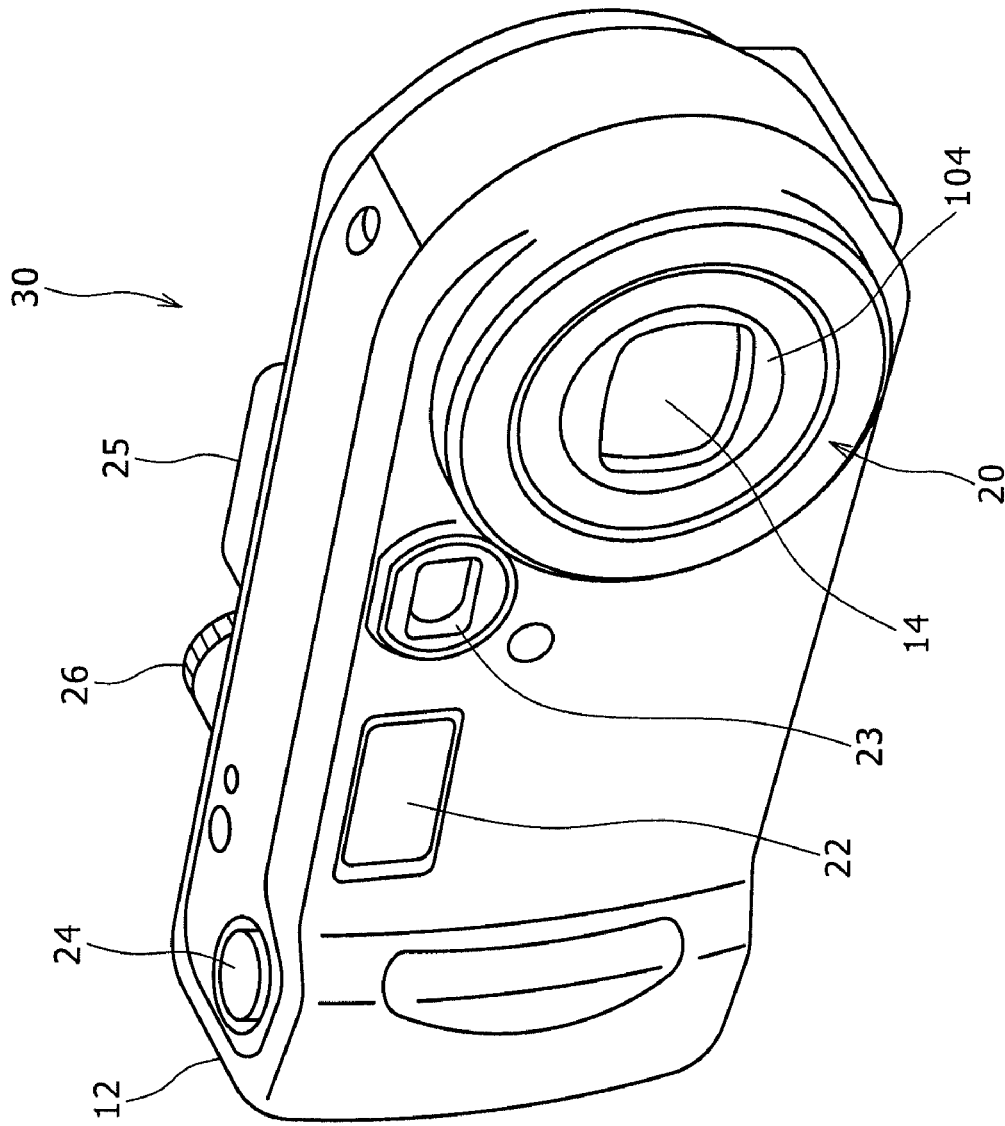
FIG. 1 is a perspective view of an imaging device according to a first embodiment of the present invention.
Figure 2:
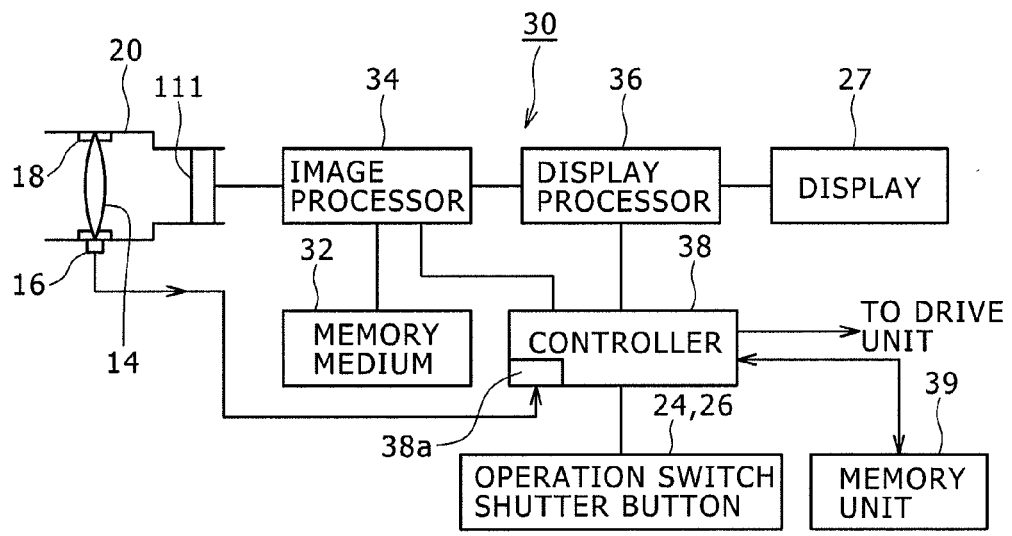
FIG. 2 is a block diagram showing the configuration of the imaging device according to the first embodiment of the present invention.

FIG. 1 is a perspective view of an imaging device 30 according to a first embodiment of the present invention. FIG. 2 is a block diagram showing the configuration of the imaging device 30 according to the first embodiment.

As shown in FIG. 1, the imaging device 30 of the present embodiment is a digital still camera and has a case 12 serving as the external package. In the present specification, the subject side is defined as the "front" and the opposite side is defined as the "back".

On the right side of the front face of the case 12, a lens barrel 20 is provided in which an imaging optical system 14, a drive unit 16 for the imaging optical system 14, and a sensor unit 18 used to detect the position of the imaging optical system 14 are incorporated. At the backside end of the lens barrel 20, an imaging element 111 (see FIG. 2) that captures a subject image guided by the imaging optical system 14 is provided. A detection signal output from the sensor unit 18 is captured in an arithmetic processor 38a in a controller 38 (see FIG. 2) to be described later.

On the upper side of the front face of the case 12, a flash unit 22 that emits flash light, an objective lens 23 of an optical finder, and so on are provided. In the present specification, the "front" refers to the subject side and the "back" refers to the image-formation side.

A shutter button 24 is provided on the top face of the case 12. Provided on the back face of the case 12 are an eyepiece window 25 of the optical finder, plural operation switches 26 for various kinds of operation such as turning-on/off of the power supply and switching between the imaging mode and the reproduction mode, and a display 27 (see FIG. 2) that displays captured video.

As shown in FIG. 2, the imaging device 30 includes the imaging element 111, a memory medium 32, an image processor 34, a display processor 36, the controller 38, a memory unit 39, and so on.

The imaging element 111 is formed of a CCD (charge coupled device), a CMOS (complementary metal oxide semiconductor) sensor, or the like that has an imaging plane 111A (see FIG. 3) and captures a subject image formed on the imaging plane 111A by the imaging optical system 14 to produce an imaging signal.

The image processor 34 produces image data based on the imaging signal output from the imaging element 111 and records the image data in the memory medium 32.

The memory medium 32 is formed of e.g. a memory card loaded/removed in/from a memory slot provided in the case 12 or a memory incorporated in the case 12.

The display processor 36 causes the display 27 to display the image corresponding to the image data supplied from the image processor 34.

The controller 38 is formed of a CPU (central processing unit) or the like that controls the image processor 34, the display processor 36, and the drive unit 16 in response to operation of the operation switches 26 and the shutter button 24. The controller 38 includes the arithmetic processor 38a that calculates the position of the imaging optical system 14 based on the detection signal output from the sensor unit 18. The memory unit 39 is formed of a ROM (read only memory) or the like and stores therein the respective peak values of the detection signal cyclically output from the sensor unit 18 depending on the movement amount of the imaging optical system 14 and data such as position data associated with the peak values.

The configuration of the lens barrel 20 will be described below.

Figure 3:
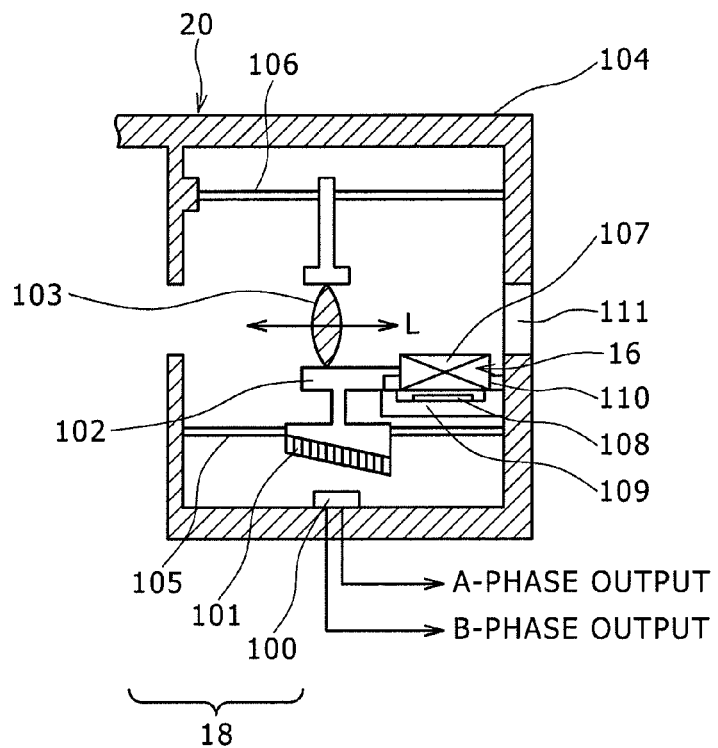
FIG. 3 is a schematic sectional view of a lens barrel according to the first embodiment of the present invention.

FIG. 3 is an explanatory diagram showing the schematic configuration of the lens barrel 20.

As shown in FIG. 3, the lens barrel 20 includes the imaging optical system 14, the drive unit 16 for the imaging optical system 14, the sensor unit 18 used to detect the position of the imaging optical system 14, a fixed tube 104, and so on.

The imaging optical system 14 is contained in the tube 104 and has at least one optical lens 103 such as a focus lens and a zoom lens. The optical lens 103 is held by a lens holder 102 (equivalent to the holder set forth in the claims). The lens holder 102 is so held as to be movable in the tube 104 along the direction of an optical axis L without rattling and rotation by guide shafts 105 and 106 provided in the tube 104 in parallel to the optical axis L. The lens holder 102 including the imaging optical system is so configured as to be driven along the direction of the optical axis L by the drive unit 16 based on a linear actuator system.

The drive unit 16 based on the linear actuator system includes a drive coil 107 fixed to the lens holder 102, a drive magnet 108 that moves the lens holder 102 along the direction of the optical axis L based on effects of magnetic attraction and repulsion with respect to the drive coil 107, and a grounded yoke 109 and an opposed yoke 110 that form the magnetic path between the drive coil 107 and the drive magnet 108. The grounded yoke 109 is disposed on the opposite side to the drive coil 107 across the magnet 108, and the opposed yoke 110 passes through the drive coil 107 wound into a ring shape.

The imaging element 111 that captures a subject image guided by the optical lens 103 is provided on the tube 104.

Figure 5:
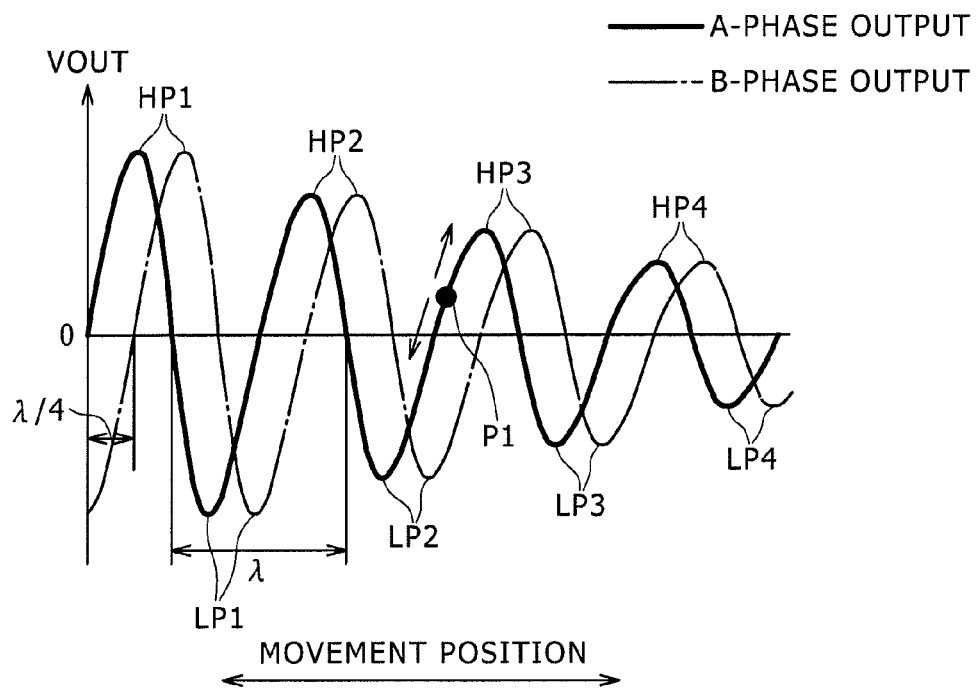
FIG. 5 is a waveform diagram for explaining detection signals output from a position detecting element according to the first embodiment of the present invention.

The sensor unit 18 outputs detection signals shown in FIG. 5. Specifically, it outputs an A-phase detection signal A sin θ in the manner of a sine wave that cyclically changes depending on the amount of the movement of the lens holder 102 including the optical lens 103 along the direction of the optical axis L, and a B-phase detection signal A cos θ in the manner of a cosine wave that is different in the phase by λ/4 from the A-phase detection signal. The peak values of the detection signals A sin θ and A cos θ change in such a manner as to decrease or increase depending on the amount of the movement of the lens holder 102 along the direction of the optical axis L.

Figure 4:
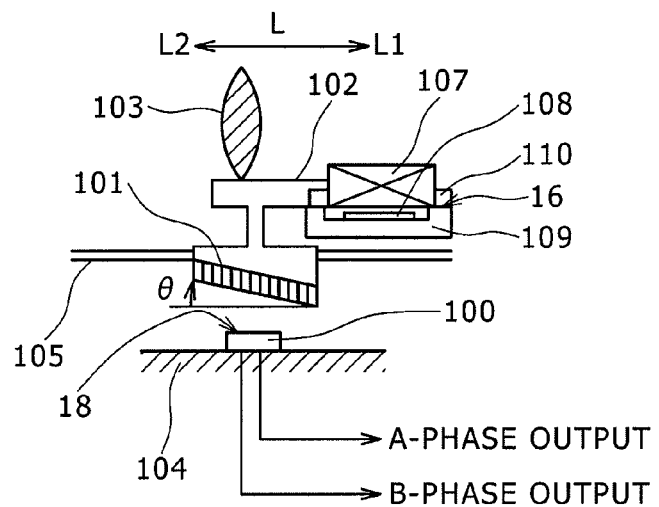
FIG. 4 is a schematic sectional view of major part of the lens barrel according to the first embodiment of the present invention.

As shown in FIGS. 3 and 4, the sensor unit 18 that outputs such detection signals includes a magneto-sensitive position detecting element 100 formed of an MR element provided on the inner wall of the tube 104, and a position detection magnet 101 that is so provided on the lens holder 102 as to face the position detecting element 100 and extend along the movement direction of the lens holder 102.

Figure 16:
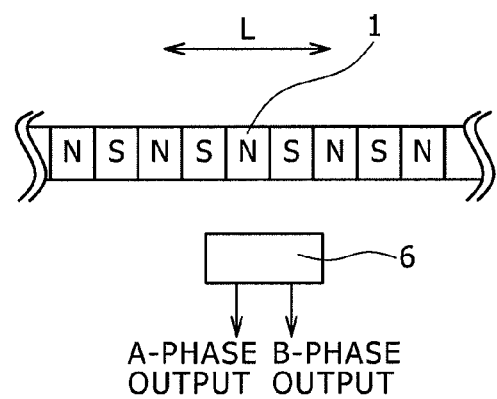
FIG. 16 is an explanatory diagram showing the relationship between the magnetization pattern of a position detection magnet and a position detecting element in the related art.
Figure 17:
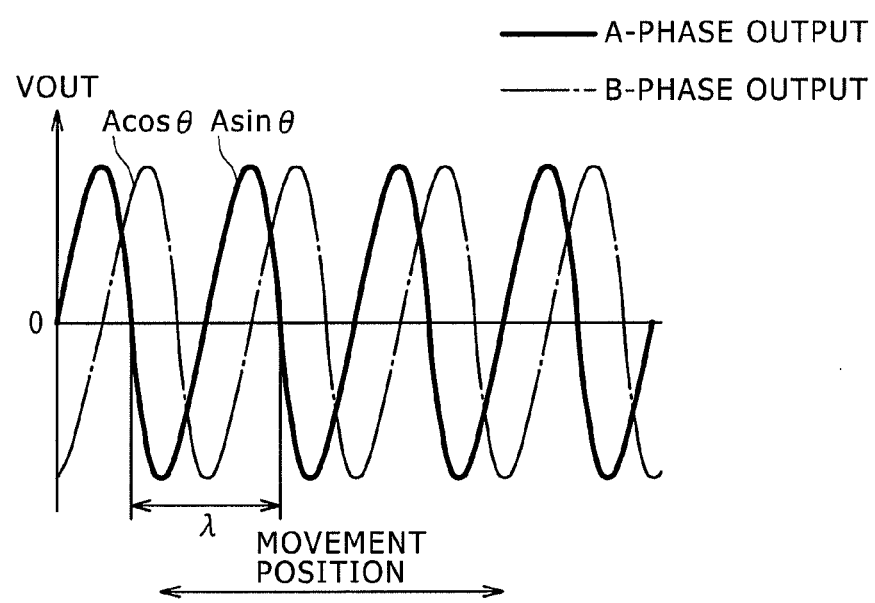
FIG. 17 is a waveform diagram for explaining detection signals output from the position detecting element in the related art.

N and S poles of the position detection magnet 101 are so magnetized as to be alternately arranged along the extension direction of the position detection magnet 101 (the direction of the optical axis L) similarly to those shown in FIG. 16. Furthermore, the position detection magnet 101 is so disposed as to be inclined at a predetermined angle θ to the line parallel to the optical axis L (the movement direction of the lens holder 102) along the movement direction of the lens holder 102. In contrast, the position detecting element 100 opposed to the position detection magnet 101 is disposed in parallel to the optical axis L.

The operation of the present embodiment will be described below.

Upon the flowing of current through the drive coil 107, thrust force parallel to the direction of the optical axis L is applied to the drive coil 107 in accordance with Fleming's left-hand rule due to magnetic flux passing between the opposed yoke 110 and the drive magnet 108. Thus, the lens holder 102 including the optical lens 103 moves together with the drive coil 107 in the direction of the optical axis L along the guide shafts 105 and 106.

The position detection magnet 101 is inclined at the angle θ to the optical axis L along the movement direction of the lens holder 102. Therefore, in the movement of the lens holder 102 along the optical axis L, difference arises in the distance between the position detection magnet 101 and the position detecting element 100 depending on the position of the lens holder 102 in the optical axis direction.

As the distance between the position detection magnet 101 and the position detecting element 100 becomes larger, the magnetic field from the position detection magnet 101 to the position detecting element 100 becomes weaken. This allows the position detecting element 100 to output the sine-wave detection signal A sin θ and the cosine-wave detection signal A cos θ shown in FIG. 5, which cyclically change depending on the movement amount of the lens holder 102.

Specifically, positive peak values HP1, HP2, . . . and negative peak values LP1, LP2, . . . of the detection signals A sin θ and A cos θ change in linkage with the movement of the lens holder 102 along the direction of the optical axis L. More specifically, the peak values decrease along with the movement of the optical lens 103 in L1 direction (wide-direction) along the optical axis L, whereas the peak values increase along with the movement of the optical lens 103 in L2 direction (tele-direction) along the optical axis L. Thus, the absolute position of the lens holder 102 can be known from the respective peak values of the detection signals A sin θ and A cos θ.

Figure 6:
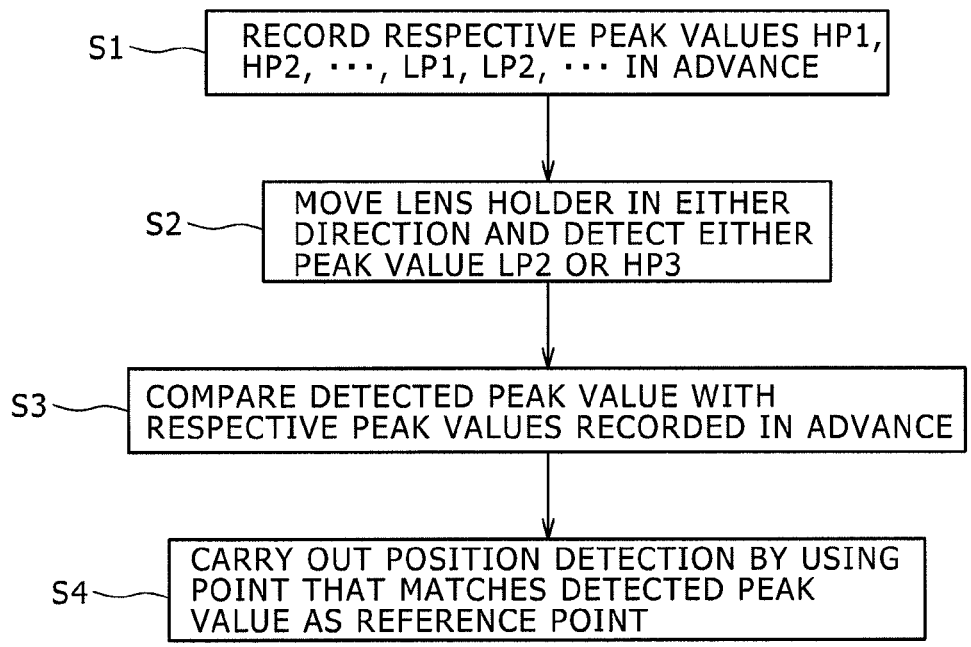
FIG. 6 is a flowchart showing position detecting operation according to the first embodiment of the present invention.

Details on how to know the absolute position of the lens holder 102 will be described below with reference to FIG. 6.

The following description is based on an assumption that the position of the lens holder 102 exists between the positions corresponding to the peak values LP2 and HP3 shown in FIG. 5 at the time of activation of the imaging device 30 for the start of imaging.

Initially, e.g. at the time of factory shipment of the imaging device 30 including the lens barrel 20, the lens holder 102 is actually moved by the drive unit 16 in the wide-direction or the tele-direction, and the respective peak values HP1, HP2, . . . and LP1, LP2, . . . of the detection signals A sin θ and A cos θ output from the position detecting element 100 are loaded in the arithmetic processor 38*a* of the controller 38. Furthermore, the peak values HP1, HP2, . . . and LP1, LP2, . . . and data on the positions of the lens holder 102 in the direction of the optical axis L, determined corresponding to these peak values, are associated with each other and a table of the associated data is created and stored in the memory unit 39 (step S1).

Subsequently, the drive unit 16 is activated by giving an activation instruction to the drive unit 16 via the controller 38 through operation of the operation switches 26 or the like. This moves the lens holder 102 in the L1 direction (wide-direction) or the L2 direction (tele-direction) along the optical axis L shown in FIG. 4. Thus, the value of the detection signal indicating the position of the lens holder 102 is shifted from a movement start point P1 shown in FIG. 5 in the arrowhead direction, and either the peak value LP2 or HP3 is detected by the position detecting element 100 (step S2).

Subsequently, the peak value detected by the position detecting element 100 is captured in the arithmetic processor 38*a* and is compared with the respective peak values HP1, HP2, . . . and LP1, LP2, . . . stored in the memory unit 39 in advance (step S3).

Subsequently, on the basis of the point that matches the detected peak value, i.e. on the basis of the position in the direction of the optical axis L corresponding to the peak value in the memory unit 39, the position of the lens holder 102 in the optical axis direction resulting from the subsequent movement thereof along the direction of the optical axis L is calculated by the arithmetic processor 38*a*.

For example, if the detected peak value is HP3, the position of the lens holder 102 resulting from the subsequent movement thereof along the direction of the optical axis L can be detected on the basis of the data on the position in the direction of the optical axis L corresponding to the peak value HP3 in the memory unit 39.

As described above, in the present embodiment, the sensor unit 18 is so configured that the peak values of the detection signals A sin θ and A cos θ output from the position detecting element 100 decrease or increase in linkage with the movement of the optical lens 103 along the direction of the optical axis L. Furthermore, on the basis of the point that matches the peak value detected first by the position detecting element 100 at the time of activation of the lens barrel, i.e. on the basis of the position in the direction of the optical axis L corresponding to the detected peak value, which matches a peak value recorded in the memory unit 39 in advance, the position of the lens holder 102 in the optical axis direction resulting from the movement thereof along the direction of the optical axis L subsequent to the activation is calculated by the arithmetic processor 38*a*. These features provide the following advantages.

a) In the position detection, the absolute position of the lens holder 102 can be detected without detecting the reference position for converting a measured position into an absolute value. In addition, the circuit that detects the reference position for converting a measured position into an absolute value is unnecessary.

b) Because the reference position for converting a measured position into an absolute value does not need to be detected, a sensor for resetting such as a photointerrupter does not need to be disposed on the fixed part such as the tube and thus space saving and cost reduction can be achieved.

c) Because the reference position for converting a measured position into an absolute value does not need to be detected, a light-blocking part does not need to be provided on the lens holder 102. Thus, space saving and weight reduction can be achieved, and the power for driving the lens holder 102 can be decreased.

d) Operation of temporarily bringing the lens holder in contact with a mechanical mechanism such as a mechanical stopper to thereby detect the reference position is unnecessary unlike the related art, and therefore fast activation operation is possible.

e) Because the absolute position of the lens holder 102 can be detected without detecting the reference position, the present position will be not lost even when the lens barrel receives external shock or the like, and thus reset operation is unnecessary unlike the related art.

f) Because the absolute position is detected through recording of the respective peak values of the output from the position detecting element, the movement direction can also be detected by reading the peak values on both the sides of the movement start point.

g) Because the position of the optical lens is detected by using two detection signals A sin θ and A cos θ output from the position detecting element 100 with phase difference, the resolution of the position detection of the optical lens is high.

Second Embodiment

A lens barrel 20 according to a second embodiment of the present invention will be described below with reference to FIGS. 7 and 8.

In the description of the following embodiments, the same component as that in the first embodiment is given the same numeral and the description thereof is omitted, and the part different from the first embodiment will be mainly described.

The second embodiment is different from the first embodiment in the configuration of a sensor unit 18.

Figure 7:
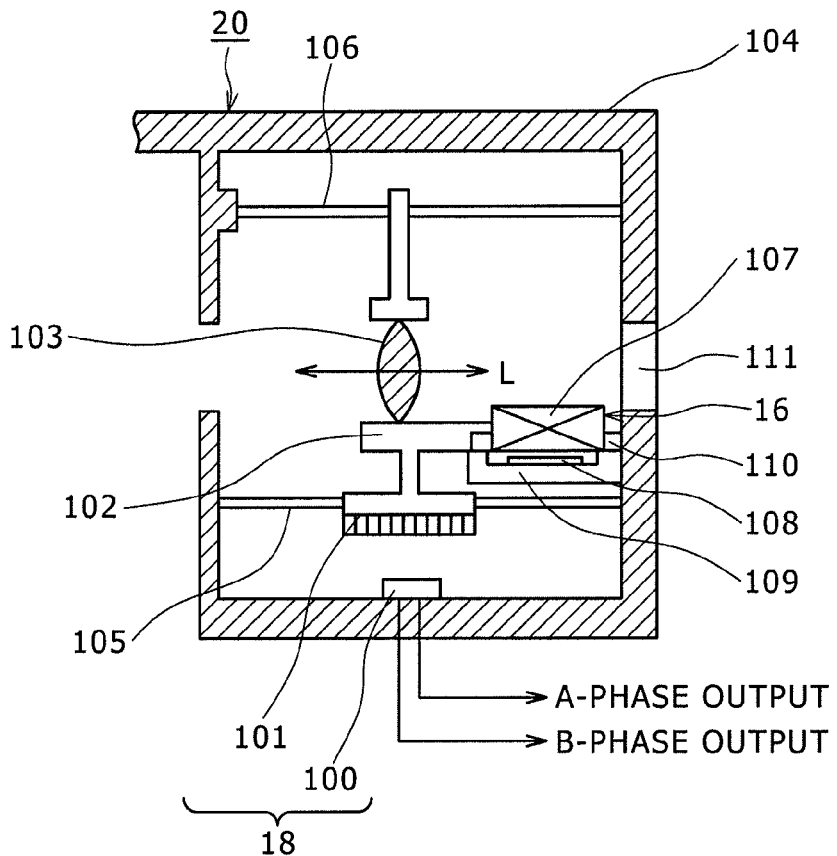
FIG. 7 is a schematic sectional view of a lens barrel according to a second embodiment of the present invention.
Figure 8:
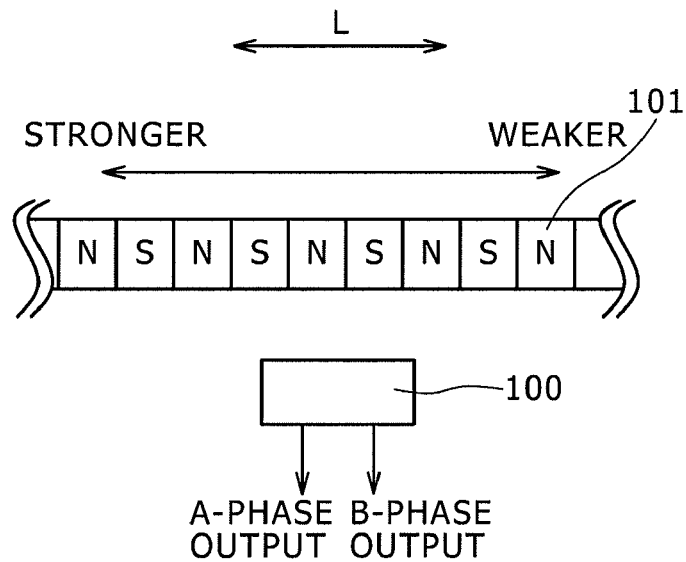
FIG. 8 is an explanatory diagram showing the relationship between the magnetization pattern of a position detection magnet and a position detecting element according to the second embodiment of the present invention.

Specifically, as is apparent from FIGS. 7 and 8, a position detection magnet 101 of the sensor unit 18 is so mounted on a lens holder 102 as to be parallel to the movement direction of the lens holder 102 (the direction of an optical axis L).

N and S poles of the position detection magnet 101 are so magnetized as to be alternately arranged along the extension direction of the position detection magnet 101 similarly to those shown in FIG. 16. In addition, the intensity of the magnetic field by the N and S poles increases or decreases from one end toward the other end of the position detection magnet 101 along the extension direction thereof.

In the lens barrel 20 according to the second embodiment, although the position detecting element 100 and the position detection magnet 101 are parallel to each other, the intensity of the magnetic field from the position detection magnet 101 to the position detecting element 100 changes depending on the position of the lens holder 102 in the optical axis direction, because the intensity of the magnetic field by the N and S poles alternately arranged along the extension direction of the position detection magnet 101 increases or decreases from one end toward the other end of the position detection magnet 101 along the extension direction thereof.

As a result, the peak values of the A-phase and B-phase detection signals A sin θ and A cos θ output from the position detecting element 100 can be decreased or increased in linkage with the movement of the optical lens 103 along the direction of the optical axis L, similarly to the detection signals shown in FIG. 5. This feature provides the same advantages as those of the first embodiment.

Third Embodiment

Figure 9:
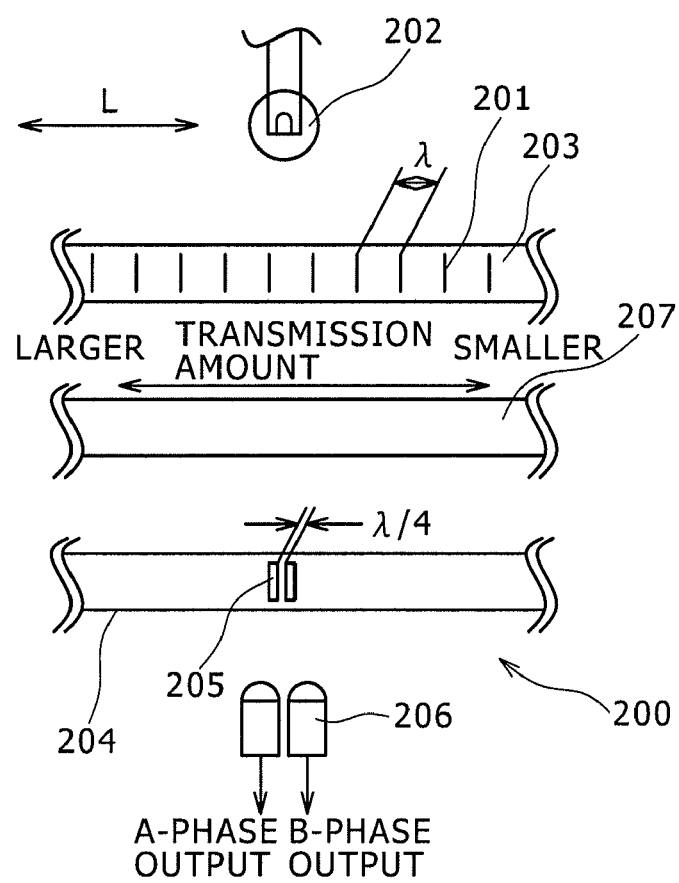
FIG. 9 is an explanatory diagram showing the configuration of a sensor unit in a lens barrel according to a third embodiment of the present invention.

A sensor unit used for a lens barrel according to a third embodiment of the present invention will be described below with reference to FIG. 9.

A sensor unit 200 of the present embodiment is based on an optical linear scale. As shown in FIG. 9, the sensor unit 200 includes a light-emitting element 202 formed of an LED (light-emitting diode) or the like for position detection, a slit plate 203, a measurement plate 204, a pair of position detecting elements 206 each formed of a photodiode or the like, and an optical filter 207.

The light-emitting element 202 is provided on a lens holder (not shown). The pair of position detecting elements 206 are so attached to a tube (not shown) as to be opposed to the light-emitting element 202.

The slit plate 203 is so provided close to the light-emitting element 202 as to face the light-emitting element 202 and extend along the direction of an optical axis L. In this slit plate 203, plural slits 201 to allow A-phase and B-phase detection signals output from the pair of position detecting elements 206 to cyclically change as shown in FIG. 5 are formed with constant intervals of λ.

The measurement plate 204 is so provided close to the position detecting elements 206 as to face the position detecting elements 206 and extend along the direction of the optical axis L. At the position opposed to the position detecting elements 206 on this measurement plate 204, a pair of slits 205 are formed with an interval of λ/4. The pair of slits 205 guide the light that has passed through the slits 201 of the slit plate 203 to the pair of position detecting elements 206 to thereby allow the position detecting elements 206 to output the A-phase and B-phase detection signals.

The optical filter 207 is so provided between the light-emitting element 202 and the pair of position detecting elements 206 as to extend along the direction of the optical axis L. The optical filter 207 serves to cause the peak values of the detection signals, which cyclically change depending on the amount of the movement of the lens holder along the direction of the optical axis L, to change in such a manner as to decrease or increase in linkage with the movement of the lens holder along the direction of the optical axis L. For this purpose, the optical filter 207 is so configured that the light-transmission amount thereof increases or decreases from one end toward the other end of the optical filter 207 along the extension direction thereof.

In the sensor unit 200 based on the optical linear scale system, the slit plate 203 and the measurement plate 204 are disposed between the light-emitting element 202 and the pair of position detecting elements 206, and the light-transmission amount of the optical filter 207 interposed between the slit plate 203 and the measurement plate 204 varies depending on the position of the lens holder in the optical axis direction. Thus, similarly to the first embodiment, signals with waveforms similar to those of the detection signals A sin θ and A cos θ shown in FIG. 5 can be achieved as the A-phase and B-phase detection signals output from the pair of position detecting elements 206.

Therefore, the third embodiment can also achieve the same advantages as those of the first embodiment.

Fourth Embodiment

A lens barrel 20 according to a fourth embodiment of the present invention will be described below with reference to FIGS. 10 and 11.

The fourth embodiment is different from the first embodiment in the configuration of a sensor unit 18.

Figure 10:
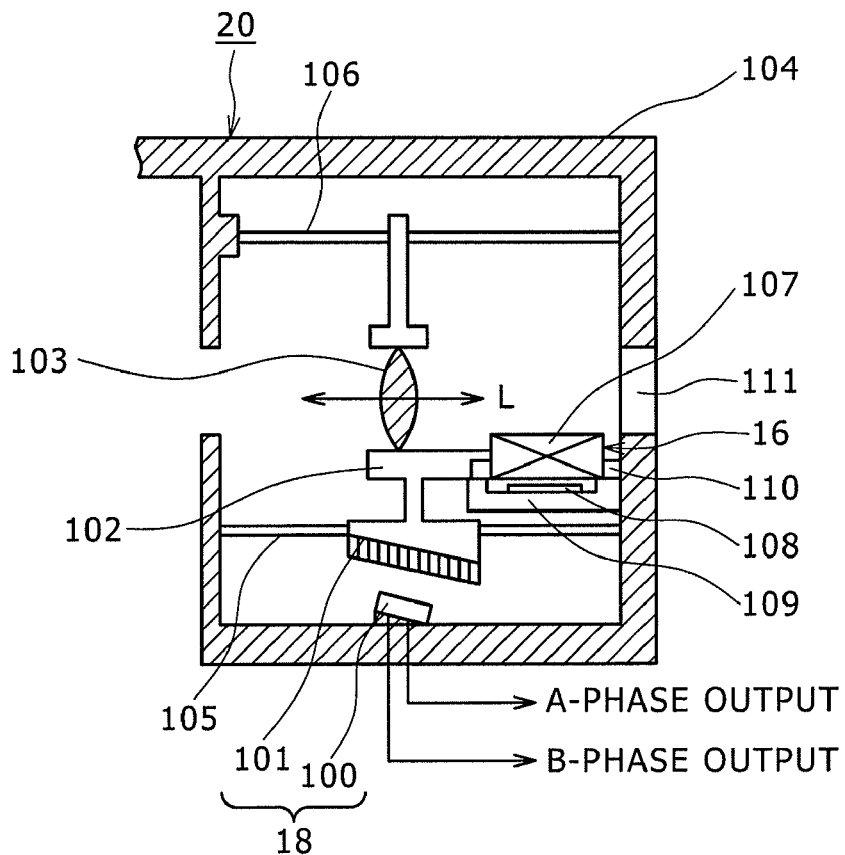
FIG. 10 is a schematic sectional view of a lens barrel according to a fourth embodiment of the present invention.
Figure 11:
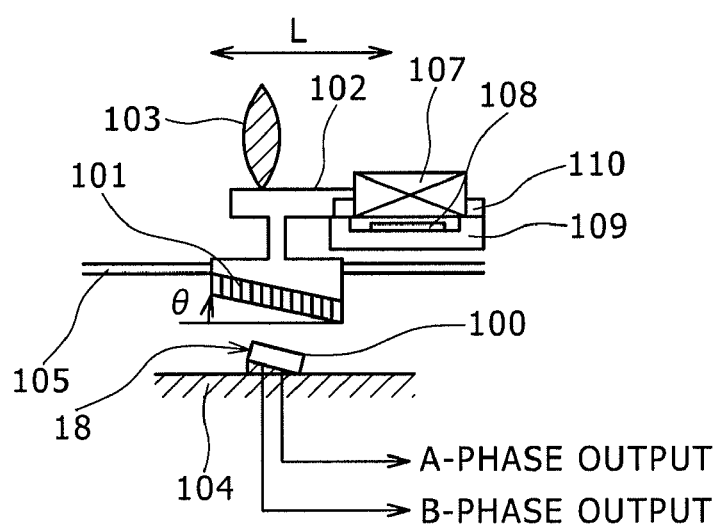
FIG. 11 is a schematic sectional view of major part of the lens barrel according to the fourth embodiment of the present invention.

Specifically, as is apparent from FIGS. 10 and 11, a position detecting element 100 of the sensor unit 18 is so provided on a tube 104 as to be inclined along the movement direction of a lens holder 102 (the direction of an optical axis L) similarly to a position detection magnet 101.

In the lens barrel 20 of this fourth embodiment, although the position detecting element 100 is inclined along the movement direction of the lens holder 102 similarly to the position detection magnet 101, difference arises in the distance between the position detection magnet 101 and the position detecting element 100 depending on the position of the lens holder 102 in the optical axis direction. Thus, the intensity of the magnetic field that acts on the position detecting element 100 from the position detection magnet 101 changes depending on the position of the lens holder 102 in the optical axis direction.

This allows the position detecting element 100 to output A-phase and B-phase detection signals A sin θ and A cos θ whose peak values decrease or increase in linkage with the movement of the optical lens 103 similarly to the detection signals shown in FIG. 5. This feature provides the same advantages as those of the first embodiment.

Fifth Embodiment

A lens barrel 20 according to a fifth embodiment of the present invention will be described below with reference to FIG. 12.

The fifth embodiment is different from the first embodiment in the configuration of a sensor unit 18.

Figure 12:
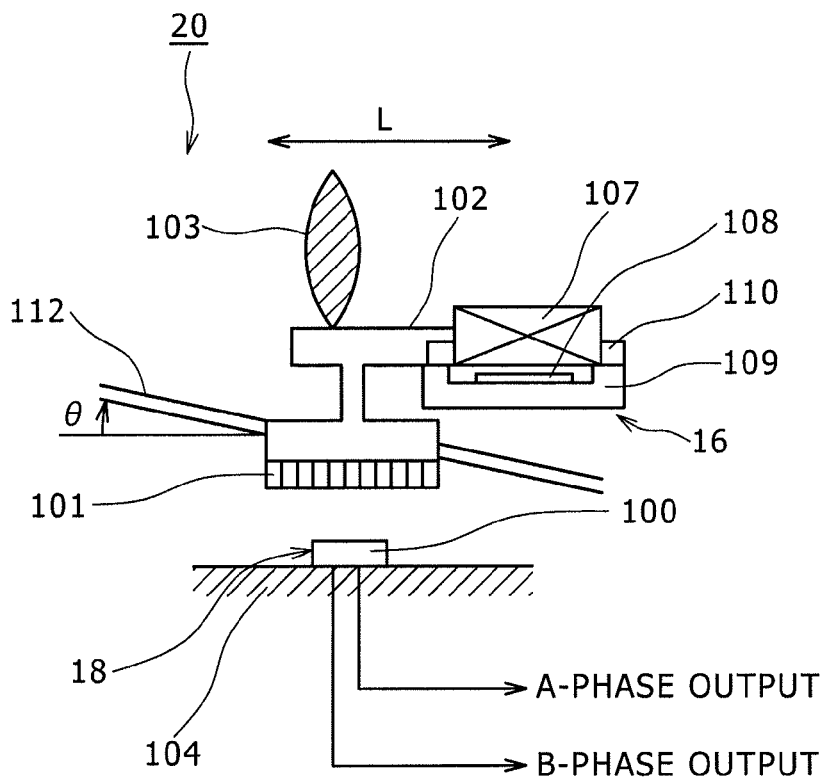
FIG. 12 is a schematic sectional view of major part of a lens barrel according to a fifth embodiment of the present invention.

Specifically, as is apparent from FIG. 12, a position detection magnet 101 of the sensor unit 18 is disposed in parallel to the direction of an optical axis L of an optical lens 103. In addition, this position detection magnet 101 is supported by a guide component 112 different from guide shafts for a lens holder 102 so that the position detection magnet 101 can move in such a direction as to become closer to or farther from a position detecting element 100 along with the movement of the lens holder 102 in the direction of the optical axis L.

This guide component 112 is inclined at an angle θ to the line parallel to the optical axis L along the movement direction of the lens holder 102.

N and S poles of the position detection magnet 101 are so magnetized as to be alternately arranged along the extension direction of the position detection magnet 101 similarly to those shown in FIG. 16. The position detecting element 100 is so provided on a tube 104 as to be parallel to the surfaces of the N and S poles of the position detection magnet 101.

In the lens barrel 20 of this fifth embodiment, because the position detection magnet 101 can move in such a direction as to become closer to or farther from the position detecting element 100 along with the movement of the lens holder 102 in the direction of the optical axis L, difference arises in the distance between the position detection magnet 101 and the position detecting element 100 depending on the position of the lens holder 102 in the optical axis direction. Thus, the intensity of the magnetic field that acts on the position detecting element 100 from the position detection magnet 101 changes depending on the position of the lens holder 102 in the optical axis direction.

This allows the position detecting element 100 to output A-phase and B-phase detection signals A sin θ and A cos θ whose peak values decrease or increase in linkage with the movement of the optical lens 103 similarly to the detection signals shown in FIG. 5. This feature provides the same advantages as those of the first embodiment.

Sixth Embodiment

A lens barrel 20 according to a sixth embodiment of the present invention will be described below with reference to FIGS. 13 and 14.

The sixth embodiment is different from the first embodiment in the configuration of a sensor unit 18.

Figure 13:
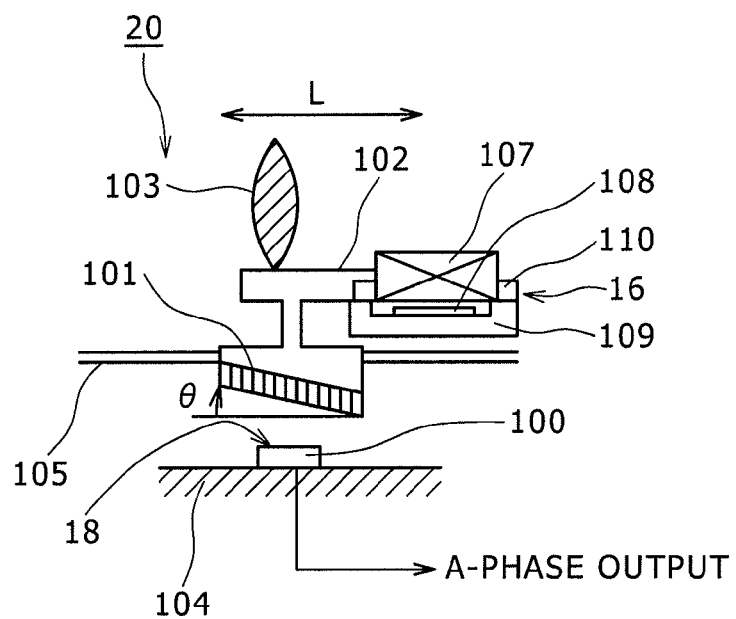
FIG. 13 is a schematic sectional view of major part of a lens barrel according to a sixth embodiment of the present invention.
Figure 14:
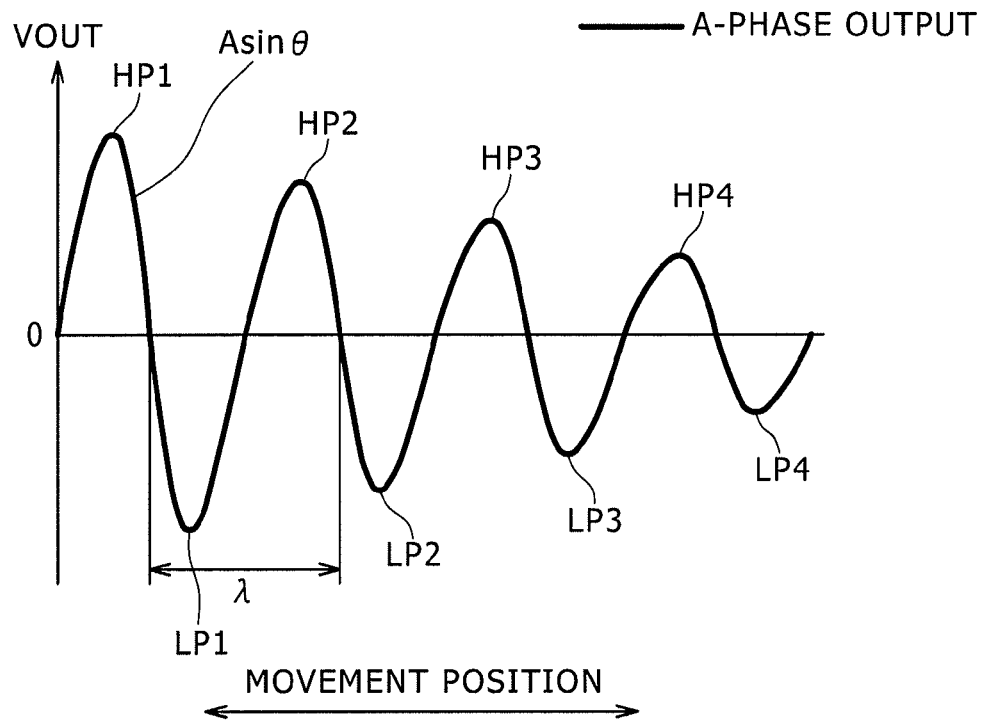
FIG. 14 is a waveform diagram for explaining a detection signal output from a position detecting element according to the sixth embodiment of the present invention.
Figure 15:
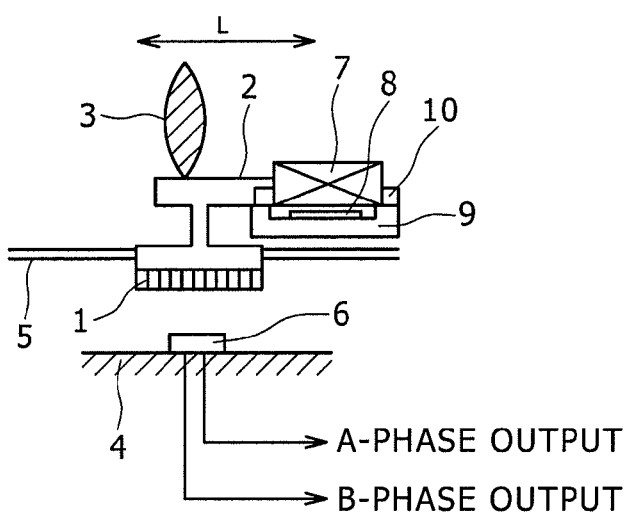
FIG. 15 is a schematic sectional view of major part of a lens barrel in a related art.

Specifically, as is apparent from FIGS. 13 and 14, a position detecting element 100 of the sensor unit 18 is so configured as to be capable of outputting a detection signal A sin θ of only one phase equivalent to the A phase. A position detection magnet 101 is so provided on a lens holder 102 as to be inclined at an angle θ to the line parallel to an optical axis L along the movement direction of the lens holder 102.

In the lens barrel 20 of this sixth embodiment, because the position detection magnet 101 is inclined along the movement direction of the lens holder 102, difference arises in the distance between the position detection magnet 101 and the position detecting element 100 depending on the position of the lens holder 102 in the optical axis direction. Thus, the intensity of the magnetic field that acts on the position detecting element 100 from the position detection magnet 101 changes depending on the position of the lens holder 102 in the optical axis direction.

This allows the position detecting element 100 to output the detection signal A sin θ in the manner of a sine wave that cyclically changes, like that shown in FIG. 14. Specifically, positive peak values HP1, HP2, . . . and negative peak values LP1, LP2, . . . of this detection signal A sin θ change in linkage with the movement of the lens holder 102 along the direction of the optical axis L. More specifically, the peak value decreases along with the movement of the optical lens 103 in L1 direction (wide-direction) along the optical axis L.

Therefore, the absolute position and the movement direction of the lens holder 102 can be known from the respective peak values of the detection signal A sin θ of only one phase. Thus, the same advantages as those of the first embodiment can be achieved by using the sensor unit that outputs the one-phase detection signal.

In the above description of the respective embodiments, a digital still camera is employed as an example of the imaging device. However, it should be noted that the embodiments of the present invention can be applied to various imaging devices such as video cameras, camera-equipped cellular phones, PDAs, and portable electronic devices.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
an imaging optical system;
a tube configured to contain the imaging optical system;
a movable holder configured to hold a lens included in the imaging optical system in the tube in such a way that the lens is movable along a direction of an optical axis of the imaging optical system;
a sensor unit configured to output a sinusoidal cyclic detection signal responsive to the movement of said holder, said cyclic detection signal having a peak value that changes depending on a movement amount of the holder;
a memory unit configured to store a relationship between peak values of the detection signal and a position of the holder in the direction of the optical axis in advance; and
an arithmetic processor configured to calculate a position of the holder in the direction of the optical axis from a peak value of a detection signal detected by the sensor unit in movement of the holder based on the relationship stored in the memory unit.

2. The lens barrel according to claim 1, wherein the peak value of the detection signal decreases or increases depending on the movement amount of the holder.

3. A lens barrel comprising:
an imaging optical system;
a tube configured to contain the imaging optical system;
a holder configured to hold a lens included in the imaging optical system in the tube in such a way that the lens is movable along a direction of an optical axis of the imaging optical system;
a sensor unit configured to output a cyclic detection signal whose peak value changes depending on a movement amount of the holder;
the sensor unit including:
  a magneto-sensitive position detecting element that is provided on one of the tube and the holder and outputs the detection signal; and
  a position detection magnet that is so provided on the other of the tube and the holder as to face the position detecting element, and causes the detection signal to cyclically change depending on the movement amount of the holder and causes the peak value of the detection signal to change in such a manner as to decrease or increase depending on the position of the holder;
a memory unit configured to store a relationship between peak values of the detection signal and a position of the holder in the direction of the optical axis in advance; and
an arithmetic processor configured to calculate a position of the holder in the direction of the optical axis from a peak value of a detection signal detected by the sensor unit in movement of the holder based on the relationship stored in the memory unit.

4. The lens barrel according to claim 3, wherein the position detection magnet extends along a movement direction of the holder,
N and S poles of the position detection magnet are so magnetized as to be alternately arranged along an extension direction of the position detection magnet, and
one of the position detecting element and the position detection magnet is inclined along the movement direction of the holder.

5. The lens barrel according to claim 3, wherein the position detection magnet extends along a movement direction of the holder, N and S poles of the position detection magnet are so magnetized as to be alternately arranged along an extension direction of the position detection magnet, and intensity of a magnetic field of the N and S poles increases or decreases from one end toward the other end of the position detection magnet along the extension direction of the position detection magnet.

6. A lens barrel comprising:

an imaging optical system;

a tube configured to contain the imaging optical system;

a holder configured to hold a lens included in the imaging optical system in the tube in such a way that the lens is movable along a direction of an optical axis of the imaging optical system;

a sensor unit configured to output a cyclic detection signal whose peak value changes depending on a movement amount of the holder;

the sensor unit including:
- a light-emitting element that is provided on one of the tube and the holder and is used for position detection;
- a photosensitive position detecting element that is so provided on the other of the tube and the holder as to be opposed to the light-emitting element and outputs the detection signal; and
- an optical linear scale that is disposed between the light-emitting element and the position detecting element, and causes the detection signal to cyclically change depending on the movement amount of the holder by varying light incident on the position detecting element from the light-emitting element and causes the peak value of the detection signal to change in such a manner as to decrease or increase depending on an amount of movement of the holder along the direction of the optical axis;

a memory unit configured to star ship between peak values of the detection signal and a position of the holder in the direction of the optical axis in advance; and an arithmetic processor configured to calculate a position of the holder in the direction of the optical axis from a peak value of a detection signal detected by the sensor unit in movement of the holder based on the relationship stored in the memory unit.

7. The lens barrel according to claim 6, wherein the optical linear scale includes:

a slit plate that is so provided close to the light-emitting element as to extend along the direction of the optical axis;

a plurality of slits that are formed in the slit plate with intervals equivalent to a cycle of the detection signal in order to cause the detection signal to cyclically change;

a measurement plate that is so provided close to the position detecting element as to extend along the direction of the optical axis;

a transmission slit that is formed in the measurement plate and guides light that has passed through the slits of the slit plate to the position detecting element; and an optical filter that is so provided between the slit plate and the measurement plate as to extend along the direction of the optical axis and causes the peak value of the detection signal to change in such a manner as to decrease or increase depending on the amount of movement of the holder along the direction of the optical axis.

8. The lens barrel according to claim 7, wherein a light-transmission amount of the optical filter increases or decreases from one end toward the other end of the optical filter along an extension direction of the optical filter.

9. An imaging device including a lens barrel, the lens barrel comprising:

an imaging optical system;

a tube configured to contain the imaging optical system a movable holder configured to hold a lens included in the imaging optical system in the tube in such a way that the lens is movable along a direction of an optical axis of the imaging optical system;

a sensor unit configured to output a sinusoidal cyclic detection signal responsive to the movement of said holder, said cyclic detection signal having a peak value that changes depending on a movement amount of the holder;

a memory unit configured to store a relationship between peak values of the detection signal and a position of the holder in the direction of the optical axis in advance; and an arithmetic processor configured to calculate a position of the holder in the direction of the optical axis from a peak value of a detection signal detected by the sensor unit in movement of the holder based on the relationship stored in the memory unit.

\* \* \* \* \*